Feb. 1, 1966  A. COLE III  3,232,709

FOAM GENERATING APPARATUS

Filed Nov. 13, 1961

INVENTOR.
AUSTIN COLE III
BY Elliott & Pastoriza
ATTORNEYS

United States Patent Office 3,232,709
Patented Feb. 1, 1966

3,232,709
FOAM GENERATING APPARATUS
Austin Cole III, Santa Monica, Calif., assignor, by mesne assignments, to United Process Machinery Company, a corporation of California
Filed Nov. 13, 1961, Ser. No. 151,807
5 Claims. (Cl. 23—252)

This invention relates to an improved apparatus for generating and forming plastic foam material.

In conventional foaming operations, an apparatus is provided to direct streams of different materials from a mixing nozzle into a suitable mold to confine the plastic foam end product to a desired shape. The materials themselves, for example, may constitute a resin and a suitable pre-polymer such as toluene di-isocyanate which, upon contact with each other, will interact and expand to provide the desired foam. This expansion normally takes place in the mold or between the retaining sidewalls defining the structure to be formed from the foam. As a consequence of the expansion of the material which may be of the order of three hundred percent, considerable pressure can build up against the sidewalls of the mold. It is necessary, accordingly, to suitably buttress the sidewalls to withstand these pressures.

Another problem encountered in conventional foaming operations is that of properly controlling the density of the final product. Because of the unpredictability of the expansion extent and rate after the materials have left the ejecting nozzle, the foam density of the material prior to expansion may vary between two and five times the density after expansion. Thus, providing a desired density is extremely difficult.

With the foregoing in mind, it is a primary object of the present invention to provide a novel foaming apparatus in which the foregoing problems are overcome.

More particularly, it is an object to provide a foam generating apparatus for materials in which the product ejected from the nozzle of the apparatus will expand less than thirty percent after leaving the nozzle to the end that pressure on retaining walls and the like is greatly reduced and a far more reliable control of density can be achieved.

Another important object is to provide a novel, portable foam generating device which has approximately six times the capacity of present apparatus and approximately one-tenth the weight thereof so that foaming operations are greatly facilitated and may be carried out in considerably less time than has been required heretofore.

Still other important objects of this invention are to provide an apparatus for generating urethane foam which is substantially non-clogging, in which a high degree of control of the final foam characteristics is provided, which has unique flushing features not requiring the use of special solvents for cleaning purposes, and which is capable of instantaneous action and long lasting operation.

Briefly, these and many other objects and advantages of this invention are attained by providing in the foaming apparatus a mixing chamber means in which the materials employed to generate to foam are pre-expanded before leaving the nozzle of the apparatus. By such preexpansion, the expansion of any further foam material after leaving the nozzle is relatively small so that the desired reduced pressure between retaining walls as well as desired density control can be more easily achieved.

The mixing chamber itself includes a nozzle portion and a pressure biased valve means at one end constituting an outlet valve into the nozzle portion for the materials to be pre-expanded. This valve means is arranged to open only when a given pressure is exceeded, such given pressure being adjustable. Thus, the degree of pre-expansion in the nozzle portion and thus the final characteristics of the foam may be controlled by this valve means.

The mixing chamber also includes novel sealing means for an agitator extending into the chamber. This sealing means is so designed that a flushing liquid constituting resin material itself may be passed through the chamber to clean both the agitator and outlet valve as well as wash the faces of the sealing structure to maintain the same clean. As a consequence, solvents and the like employed heretofore to remove clogging material in various components within the apparatus is avoided.

A better understanding of the improved foaming apparatus of this invention together with further features thereof will be had by now referring to a preferred embodiment as illustrated in the accompanying drawings, in which.

Figure 1:
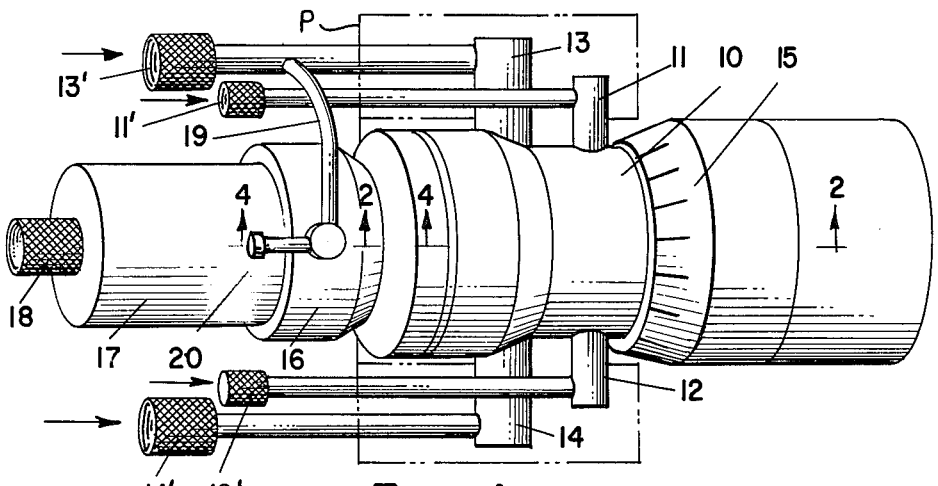
FIGURE 1 is a perspective view of the apparatus.

Referring first to FIGURE 1, the apparatus includes a mixing chamber 10 provided with means for introducing materials in the form of first, second, third, and fourth valve housing 11, 12, 13, and 14 communicating with the chamber as shown. These housings are arranged to recive materials through suitable connecting conduits terminating in pipe couplings 11′, 12′, 13′, and 14′, respectively, for connection to suitable sources of such materials under pressure (not shown).

The front end of the chamber 10 terminates in a pressure biased outlet valve means including an exterior rotatable housing 15. The opposite end of the chamber connects to an auxiliary flushing chamber 16. Behind the chamber 16, there is provided an air motor 17 arranged to be connected to a source of air as by a suitable coupling 18. The air motor 17 is employed to drive an agitator within the mixing chamber 10 as will also become clearer when FIGURE 2 is described.

As shown in FIGURE 1, there is provided a bypass conduit 19 for receiving liquid passed into the nozzle 13′. This bypass 19 will pass the liquid into the chamber 16 under control of a suitable valve 20.

Figure 2:
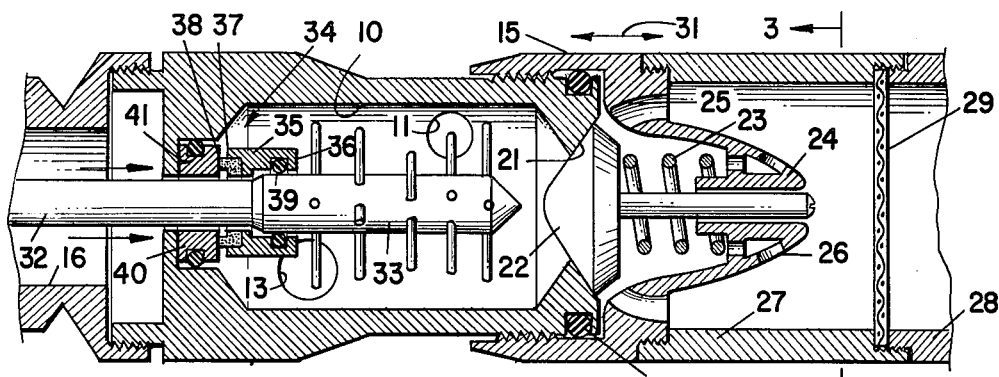
FIGURE 2 is a fragmentary cross section taken in the direction of the arrows 2—2 of FIGURE 1.
Figure 3:
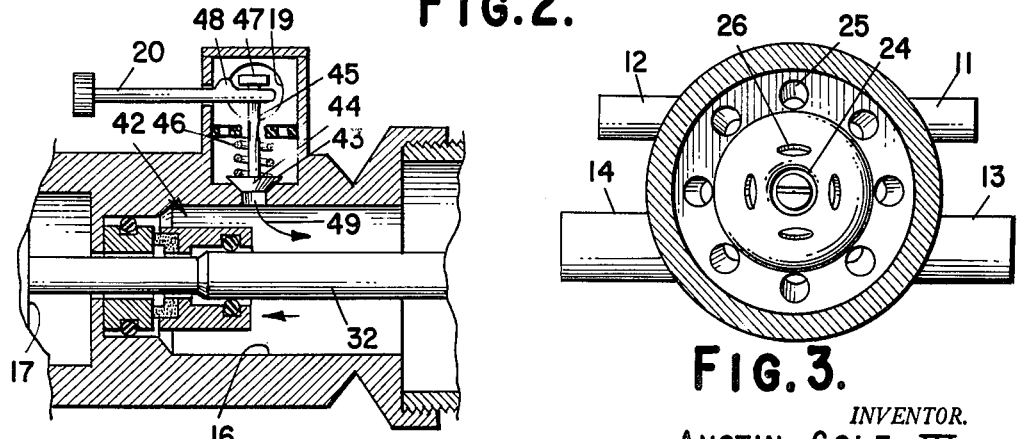
FIGURE 3 is a transverse cross section taken in the direction of the arrows 3—3 of FIGURE 2; and, FIGURE 4 is another fragmentary cross section taken in the direction of the arrows 4—4 of FIGURE 1.

Referring now to FIGURES 2 and 3, it will be noted that the righthand interior portion of the mixing chamber 10 terminates in an annular valve seat 21 seating a valve head 22. The valve head 22 is biased against the seat with a given pressure by coil spring 23 as shown. The far end of the spring is held within nose portion 24 integrally formed as part of the rotatable housing 15. This nose portion includes openings such as indicated at 25 and 26. With this arrangement, it will be evident that by threading the member 15, the degree of compression of the spring 23 with respect to the valve head 22 may be adjusted.

The outlet portion of the mixing chamber further includes a nozzle portion comprising cylindrical guiding sleeve 27 threaded to the member 15 as shown and a cooperating end nozzle 28. The nozzle 28 cooperates with the end of the sleeve 27 to sandwich a screen 29 therein as illustrated in FIGURE 2.

An O-ring 30 provides a seal between the member 15 and the exterior of the mixing chamber 10 as shown so that when the desired adjustment of the pressure on spring 23 is effected, a proper seal is maintained. The double-headed arrow 31 indicates that the member 15 may be moved in either direction.

Referring to the left end of FIGURE 2, there is illustrated a shaft 32 for the motor 17 described in FIGURE 1 extending into the opposite end of the mixing chamber 10 and serving to support an agitator structure 33. A sealing means, designated generally by the numeral 34 provides a seal for the shaft 32 to prevent materials within the mixing chamber from passing out the opposite end of the chamber. This sealing means constitutes an important feature of the invention and is designed in such a manner that proper sealing is effected and yet the seal may be readily cleaned by a flushing solution. Towards this end, it will be noted that the seal includes a sleeve 35 having opposite annular ends 36 and 37 of given exposed areas. An annular bearing seal member 38 in turn is secured within the end 37. The bearing member and sleeve rotate with the agitator shaft portion 33, there being provided an internal O-ring 39 to seal the sleeve to the shaft portion 33. The arrangement is such that the sleeve 35 is axially movable along the shaft while rotating with the shaft.

Cooperating with the sleeve 35 is a ring 40 including an exterior O-ring 41 in sealing relationship with the opposite end portion of the chamber 10 as shown. The shaft 32 passes freely through the ring 40. An opposing face of the ring 40 serves as a bearing surface for bearing member 38. The design is such that the area of the remaining surface at the left end of the sleeve 35 is less than the area of the end 36 so that the sleeve 35 is forced towards the opposed annular end of the ring 40 by a force proportional to the pressure within the chamber 10. On the other hand, if pressure in the auxiliary chamber 16 to the left of the sealing structure 34 exceeds the pressure in the chamber 10, the sleeve 35 will be axially moved to the right to separate the bearing member 38 from the ring 40. The sealing means thus functions as a check valve and permits flushing liquid to pass from the auxiliary chamber 16 into the mixing chamber 10 in such a manner that the opposing engaged surfaces of the seals are washed by the flushing liquid.

Figure 4:
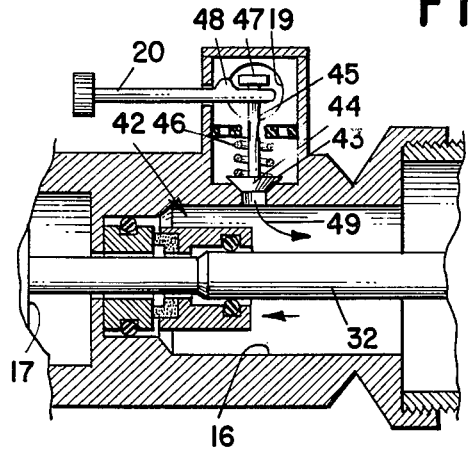

Referring now to the fragmentary view of FIGURE 4, which constitutes a continuation of the left end of FIGURE 2, it will be noted that an additional sealing means 42 is provided at the left end of the flushing chamber 16 where the shaft 32 passes to the motor 17. This sealing means is identical to the sealing means 34 described in FIGURE 2, and is so oriented as to prevent any liquid within the flushing chamber 16 from passing into the motor housing.

In FIGURE 4, the manner in which the conduit 19 connects into the auxiliary chamber 16 together with the valve 20 for operating the same is shown in detail. The various valve bodies 11, 12, 13, and 14 described in FIGURE 1 incorporate identical construction to that illustrated in FIGURE 4, and therefore the description of the valve in FIGURE 4 will suffice for all.

First, it is to be noted that the communication opening into the chamber 16 is absolutely flush with the wall. The same is true for the openings of the valve housings 11 and 13 as illustrated in FIGURE 2. As shown, the bore merges into a conical valve seat 43 receiving a valve head 44 at the end of a valve stem 45. A spring 46 biases the valve head 44 onto the seat 43. The upper end of the valve stem 45 may terminate in an enlarged head 47 beneath which a cam 48 on the operating push button 20 may be provided so that pushing in of button 20 will cam the head 47 upwardly to open the valve 44. Any other suitable means for operating the valve head 44 may be employed. In FIGURE 1, the dot-dashed lines P extending from the valve housings 11, 12, 13, and 14 schematically represent mechanical push button operators for the valves which may be individually or simultaneously operated.

With the above description in mind, the operation of the foaming apparatus will now be described.

With reference to FIGURE 1, in the case of providing urethane foam, a suitable glycol liquid resin is fed into the tube coupling 13' to pass through the valve body 13 into the mixing chamber 10. A pre-polymer in liquid form such as toluene di-isocyanate is passed into the coupling 14' and valve body 14 to the mixing chamber 10. These two materials will interact to expand within the mixing chamber 10. However, to accelerate this expansion and provide the desired foaming action, there is introduced into the valve bodies 11 and 12 through the respective couplings 11' and 12' Freon 11 and Freon 12.

When these materials in proper proportion are received in the mixing chamber 10, they will mix together, the Freon 12 remaining a liquid because of the back pressure provided by the valve. As a consequence, there will be a build up of pressure within the mixing chamber 10 as the materials are further introduced. The sealing means 34 as described heretofore will prevent any of the material within the chamber 10 from passing into the rear auxiliary flushing chamber 16 while still permitting the shaft freely to rotate so that the agitator structure 33 operated by the air motor 17 thoroughly mixes the ingredients within the chamber. The pressure within the chamber 10 will build up to a value exceeding a predetermined given pressure necessary to maintain the Freon 12 liquid and corresponding to the force exerted by the spring 23 on the valve head 22. When this occurs, the valve head 22 will be urged to the right and the mixed material will pass between the valve head 22 and valve seat 21, and through the various openings 25 and 24 within the nose cone structure at which point immediate expansion takes place in the nozzle portion of the mixing chamber following the valve. The resultant reduction in pressure then permits pre-expansion as a result of the rapid vaporization of the Freon 12 to "blow" the mixture into a desired foaming substance. The foam material will then continue out through the screening material 29 which aids in providing a more homogeneous consistency to the material which then passes from the outlet nozzle 28.

Since most of the expansion of the material has taken place within the nozzle portion immediately following the valve, the resultant final density of the material foamed in place may be relatively carefully controlled. In practice, it is found that a control within plus or minus ten percent is possible. Further, because of the tremendous pre-expansion which has taken place, further expansion after leaving the nozzle 28 which would occur between retaining walls or molding forms is no more than thirty percent as compared to perhaps two or three hundred percent in prior art operations. Thus, the expansive pressure on such retaining walls and molds is considerably less, enabling more economical molds to be used and enabling considerably more rapid construction of the same.

When the foaming operation has been completed, it is desirable to immediately flush the mixing head. This is achieved by opening only the valve 20 to pass resin from the coupling 13' through the bypass line 19 into the flush chamber 16. This resin will be forced as indicated by the arrow 49 in FIGURE 4 through the sealing structure 34 of FIGURE 2 and will provide sufficient pressure to move the sleeve 35 to the right as described heretofore so that the flushing resin will pass between the engaging sealing faces on the ring 41 and member 38 to wash the same. Also, the flushing resin will pass by the openings 11 and 13 shown in FIGURE 2 and thoroughly wash and cleanse these openings. Finally, the flushing resin will force the valve head 22 to the right and wash the valve seat 21 as well as the head 22, the resin passing through all of the openings 24 and 25 as well as around the spring 23 to wash all of these portions before exiting from the nozzle 28.

Since the resin constitutes one of the ingredients employed in forming the foam, there is not required any subsequent washing out of a flushing agent. Therefore, the structure is ready for immediate and instantaneous action upon starting a subsequent operation. Instantaneous action is also assured because of the proximity of the valve locations for the inlet openings immediately adjacent to the mixing chamber itself.

In the event it is desired to change the pressure at which the materials will pass from the mixing chamber 10, it is a simple matter to tighten up the pressure on the spring 23 by rotating the exterior housing 15. Thus, it is clear that the given pressure which must be exceeded for the material to pass from the chamber 10 may be carefully adjusted for optimum results.

While only one particular embodiment of the instant invention has been shown and described, it will be evident that many of the components may be replaced by equivalent functioning members. The improved mixing head is therefore not to be thought of as limited to the exact embodiment shown merely for illustrative purposes.

What is claimed is:

1. A foam generating apparatus for pre-expanding materials, comprising, in combination:
    (a) a mixing chamber including a nozzle portion at one end of said chamber;
    (b) means for individually introducing materials into said chamber simultaneously, one of said materials being in liquid form and adapted to expand into a gas at room temperature when the pressure exerted on said materials drops below a given pressure;
    (c) a pressure biased outlet valve at one end of said chamber adapted to open to pass said materials into said nozzle portion only when the pressure exerted on said materials in said chamber exceeds said given pressure;
    (d) a rotatable shaft entering the opposite end of said chamber;
    (e) agitator means carried by said shaft to mix together said materials;
    (f) a source of flushing material adjacent to the opposite end of said chamber exterior of said chamber; and
    (g) sealing means for said shaft at said opposite end, said sealing means blocking the flow of said materials from passing out of said chamber through said opposite end and permitting flow of said flushing material through said opposite end about said shaft into said chamber such that said sealing means functions as a check valve for introducing said flushing material.

2. An apparatus according to claim 1, in which said sealing means includes:
    (a) a sleeve surrounding said shaft and rotatable with said shaft, said sleeve including an internal O-ring to seal the same to said shaft;
    (b) a ring including an external O-ring in sealing relationship with said opposite end of said chamber, said shaft passing through said ring and said ring and sleeve being axially spaced to present opposing annular end surfaces to each other; and
    (c) an annular bearing member secured to said opposing end of said sleeve and in bearing relationship with said opposing end of said ring to provide a seal, the area of the opposite end of said sleeve being greater than the remaining area of said opposing end exterior of said bearing member whereby pressure in said chamber urges said sleeve in an axial direction towards said ring with a force proportional to the pressure in said chamber, said sleeve being axially movable in a direction away from said ring when the pressure of said source of flushing material exceeds the pressure in said chamber, whereby the engaging faces of said ring and bearing sleeve are washed by said flushing material when the same passes from said source through said ring into said chamber.

3. An apparatus according to claim 2, including an auxiliary flushing chamber communicating with said source of flushing material and disposed on the opposite side of said sealing means from said chamber for receiving flushing material preparatory to passing the same into said chamber through said sealing means, said shaft extending through said auxiliary flushing chamber to pass out the other end thereof; and an additional sealing means similar to said first-mentioned sealing means for providing a seal for said shaft at said other end of said auxiliary flushing chamber.

4. An apparatus according to claim 3, in which said one end of said mixing chamber terminates in an annular valve seat and in which said pressure biased valve means includes a valve head seated on said seat;
    (a) a biasing means urging said valve head against said seat; and
    (b) means for adjusting the force of said biasing means against said valve head whereby said valve head is responsive to the pressure of materials in said chamber in excess of said given pressure to permit egress of said materials into said nozzle portion.

5. An apparatus according to claim 4, in which said means for individually introducing materials into said chamber simultaneously includes:
    (a) first, second, third, and fourth individual openings extending laterally into the sides of said mixing chamber, said openings terminating flush with the interior walls of said mixing chamber;
    (b) valve means immediately adjacent said openings for introducing said materials when open and for cutting off the flow of said materials into said chamber when closed; and
    (c) means for individually and simultaneously operating each of said valve means.

References Cited by the Examiner

UNITED STATES PATENTS

| | | | |
|---|---|---|---|
| 2,219,656 | 10/1940 | Miller | 137—540 X |
| 2,764,565 | 9/1956 | Hoppe et al. | 23—288 X |
| 2,764,566 | 9/1956 | Simon et al. | 260—2.5 |
| 2,816,741 | 12/1957 | Shuffman | 260—2.5 |
| 2,990,252 | 6/1961 | Geldern et al. | 23—252 |

MORRIS O. WOLK, *Primary Examiner.*

JAMES H. TAYMAN, JR., *Examiner.*